June 27, 1967 M. Z. AHMED ET AL 3,328,669
FIRING CIRCUIT FOR SILICON CONTROLLED INVERTER CIRCUIT
Filed Sept. 18, 1964

INVENTORS
MOHAMMED Z. AHMED
MAX M. WERTHEIM
BY
*John K. Conant*

ATTORNEY

United States Patent Office 3,328,669
Patented June 27, 1967

3,328,669
FIRING CIRCUIT FOR SILICON CONTROLLED
INVERTER CIRCUIT
Mohammed Z. Ahmed, Rutherford, and Max M. Wertheim, Elizabeth, N.J., assignors to Engelhard Hanovia, Inc., Newark, N.J., a corporation of New Jersey
Filed Sept. 18, 1964, Ser. No. 397,521
9 Claims. (Cl. 321—45)

The present invention relates to silicon controlled rectifiers (hereafter referred to as SCR's). More particularly it relates to a circuit in which a saturable core oscillator is employed to "fire" (turn on) an SCR.

As is well known an SCR operates in the nature of a switch which is switched on, i.e. fired, by applying current to a gate electrode of the SCR. When the SCR is on power can pass through it from its anode side to its cathode side. It is turned off to its non-conductive state by applying a reverse current to its cathode side. SCR's are efficient switching and rectifying components since they operate with low power losses and conduct a much larger amount of power than the power required to turn them on and off.

The SCR circuit of this invention is particularly adapted for use in an inverter for supplying square wave alternating current from a source of direct current.

In this inverter a pair of SCR's are connected to switch direct current power alternately in opposite directions through the primary coil of a coupling transformer. This induces an alternating current in the transformer's secondary coil which may be connected to supply the alternating current to a load circuit.

The SCR's are fired alternately by the operation of two oppositely arranged circuits of the present invention in which the gate electrode of each SCR is coupled to a saturable core oscillator. After each SCR has been on for a half-cycle of the oscillator it is turned off for the following half-cycle by the operation of a commutating capacitor connected between the output sides (anode sides) of the two SCR's.

This inverter produces alternating current power having equal and complete half-cycles of square wave voltage. In order to supply this form of power the SCR's must turn on and off at precisely equal intervals. If for example a first half-cycle of current from the oscillator is short, the SCR turned on by that cycle will not be on for the full time it should be and the corresponding cycle of power induced in the secondary coil of the coupling transformer will similarly be short. This could damage the SCR's.

Moreover, if a first half-cycle of current from the oscillator is too short, the SCR will not conduct a sufficient time to build up enough of a charge on the commutating capacitor for the capacitor to shut off the SCR at the end of the half-cycle. The SCR will therefore remain on and conducting when the following half-cycle of current turns on the other SCR. With both SCR's on no alternating current power is induced in the secondary coil of the coupling transformer and both SCR's remain on and will burn themselves out. This may also damage the transformer.

The oscillator in the circuit of the present invention is a transformer coupled oscillator in which components subsequently to be described deliver power alternately in opposite directions through the primary coil of the transformer. This induces an oscillating current in a secondary coil which is connected to the gate electrode of an SCR. The transformer has a saturable square loop core so that the current induced in the secondary coil will be in the form of sharply defined square waves of a equal length and each a full half-cycle in width.

In order for the transformer to produce successive waves in this form, the core must saturate sharply to its maximum flux density as power is applied through the primary coil in one direction. Then at power removal, which is the point at which the power applied to the primary coil drops momentarily to zero preparatory to being applied in the opposite direction, the flux must collapse sharply to zero so that the power applied in the opposite direction through the primary coil will produce flux in the core to the saturation point in the opposite direction.

In order for the flux thus to be built up sharply in successively opposite directions in close correspondence with the reversal of direction of the power through the primary coil, current must be free to flow in a reverse direction through the secondary coil at power removal, when, for a moment, no power is flowing in the primary coil. But the gate of the SCR to which the secondary coil is connected does not permit the necessary reverse current.

It is therefore a principal object of the present invention to provide for the above described reverse flow of current in the secondary coil of a saturable core oscillator which is connected to fire an SCR and to provide for the reverse flow without interfering with the desired operation of the SCR. The SCR firing circuit including provision for reverse flow of current through the oscillator secondary coil at power removal in accordance with this invention, therefore makes it possible and practical to use a saturable core oscillator to fire an SCR in a manner in which the SCR will deliver equal and complete half-waves of square wave current at equal intervals.

Other types of oscillators have been used to fire SCR's periodically, but it is a particular advantage to be able to use a saturable core oscillator as provided for by the present invention. Specifically, this oscillator is of simpler construction and hence is more rugged and dependable than other types of oscillators which have been used. In addition it operates with low power and entails low power losses.

One SCR firing circuit in accordance with this invention will produce equal half-wave pulses. An inverter for producing alternating current is formed of two of these SCR circuits oppositely arranged relative to the oscillator secondary coil so as to produce alternate oppositely directed half-wave pulses in continuous succession.

In the circuit of the invention one end of the secondary coil associated with the core of the oscillator is connected through a first resistor to the gate electrode of the SCR. The other end of the secondary coil is connected to the cathode of the SCR. The path for reverse flow of current through the secondary coil is provided by a second resistor connected across the ends of the secondary coil with the first resistor being between the adjacent end of the secondary coil and the connection to the second resistor.

The value of the second resistor must be low enough to provide for sufficient reverse flow of current to collapse the flux density in the core sharply to zero at the moment the power to the primary coil is removed, but not so as to short circuit the effective actuating current from the gate electrodes of the SCR.

In accordance with the invention it has been found that a second resistor may be used in the location described above and, when the value of this second resistor is a value determined by a formula subsequently to be explained, a saturable core oscillator is successfully utilized to fire an SCR at precisely predetermined intervals to produce full width half-cycles of square wave current.

The present invention will now be described in detail with reference to the accompanying drawing which is a schematic diagram of an SCR operated inverter formed by a pair of SCR firing circuits in accordance with the invention.

Referring now to the drawing, an SCR operated inverter embodying firing circuits of the present invention comprises a saturable core oscillator 10 coupled through a pair of gate circuits 11 and 11' to the gate electrodes 12 and 13 of a pair of SCR's 14 and 15 of a power inverter 16. The gate circuits 11 and 11' are identical but oppositely directed in order to fire the SCR's 14 and 15 alternately.

In the power inverter 16 the SCR's 14 and 15 are connected respectively by conductors 17 and 18 to the opposite ends of a primary coil 19 of a coupling transformer 20 which delivers power from the inverter 16 to a load circuit indicated at 21.

The source of direct current power which is inverted by the power inverter 16 is indicated by the negative terminal 22 and the positive terminal 23. The negative terminal 22 is connected by a conductor 24 to the cathode sides of the SCR's 14 and 15. The anode sides of the SCR's 14 and 15 are connected respectively by conductors 17 and 18 to the opposite ends of the primary coil 19 which has a center tap 25 connected by conductor 26 to the positive terminal 23. A switch 27 is provided in the conductor 26 to switch the power to the inverter 16 on and off. A choke coil 28 is also connected in the conductor to keep unwanted excess inverse voltage from the SCR's.

When one or the other of the SCR's 14 and 15 is fired by the oscillator 10 (and switch 27 in conductor 26 is closed), power from terminal 23 flows through conductor 26 to the center tap 25 of the primary coil 19. If SCR 14 has been fired, the power flows from the center tap 25 through the upper half of the primary coil 19, out over conductor 17 to the SCR 14 through which the power flows into the conductor 24 to the negative terminal 22.

On the other hand, when SCR 15 is fired (SCR 14 then being shut-off in the manner described below), the power flows in the opposite direction through the primary coil 19. In this instance the power to the center tap 25 flows through the bottom half of primary coil 19 and over conductor 18 to the SCR 15 through which it passes into the conductor 24 to negative terminal 22.

After the respective SCR's 14 and 15 have been fired alternately by the oscillator 10 they are alternately turned off by the operation of a commutating capacitor 30 which is connected between the conductors 17 and 18 so as to be across the anode sides of the SCR's.

As one or the other of the SCR's 14 or 15 is conducting so that power flows through the primary coil 19 and respectively through the conductor 17 or 18, the commutating capacitor 30 charges up. Then, at the instant the oscillator 10 fires the previously non-conducting SCR, the communicating capacitor discharges a surgae of current in a reverse direction through the previously conducting SCR and shuts it off.

Looking at the drawing, the firing of the previously non-conducting SCR opens a discharge path for the capacitor charge to flow to the cathode side of the previously conducting SCR thereby applying the reverse current which shuts it off. This action is almost instantaneous and the conducting SCR is thus shut off at the moment the other SCR is fired and begins to conduct. When the commutating capacitor has discharged to shut off one SCR, it is then charged up again by the flow of power through the other SCR and so on.

The commutating capacitor 30 must of course be large enough to build up a charge during a half-cycle of the oscillator 10 sufficient to shut off the conducting SCR.

The saturable core oscillator 10 for firing the SCR's 14 and 15 is of conventional design which includes a transformer core 31 as means for coupling the oscillator output to the gate circuits 11 and 11'. The core 31 is preferably made of material such as tape wound toroids of 50-50 nickel-iron which permits close coupling, has low-leakage reactance and saturates sharply to produce square wave oscillations.

Power to operate the oscillator 10 is derived from a source of direct current power indicated by the terminals 32 and 33. While two separate sources of power are shown—one for the inverter 16 and one for the oscillator 10—it will be appreciated that a single source may be used.

The configuration of the oscillator 10 shown in the drawing is well known and is built around a pair of PNP transistors 35 and 36 which have their collectors connected respectively to the ends of a primary coil 37 associated with the core 31. A conductor 38 is tapped into the center of the primary coil 37 and connects it to the negative power terminal 33. The positive power terminal 32 is connected to the emitters of the transistors 35 and 36 by a conductor 39 to the emitter of transistor 35 with a branch conductor 40 to the emitter of transistor 36. Thus the transistors 35 and 36 are connected to deliver current respectively through opposite halves of the primary coil 37 and in opposite directions.

The bases of the transistors 35 and 36 are connected respectively by conductors 41 and 42 to the ends of a center tap feedback coil 43 adjacent the core 31. Resistors 44 and 45 are provided in the respective conductors 41 and 42 to equalize the drive to the transistors 35 and 36 from the feedback coil 43.

The circuit through the center tap 46 of the feedback coil 43 is completed by a conductor 47 connected into a conductor 48 which extends between the conductors 38 and 39 to the power sources. Resistors 49 and 50 are connected in the conductor 48 respectively on opposite sides of the connection with the conductor 47 so that a starting bias is applied from the power source through the feedback coil 43 to the bases of the transistors 35 and 36.

When the power is applied to the oscillator 10 the transistors 35 and 36 are alternately switched to their conductive and non-conductive states. When the transistor 35 is conductive it delivers current through the top half of the primary coil 37 in one direction until the flux density in the core 31 reaches the saturation point of the core. At this point the power induced in the feedback coil 43 increases the potential at the base of transistor 36 and reduces the potential at the base of transistor 35 so that transistor 36 starts to conduct and transistor 35 shuts-off. The transistor 36 then delivers power through the bottom half of the primary coil 37 in the opposite direction until the flux in the core reaches the saturation point in the opposite direction at which point power induced in the feedback coil 43 again switches the transistors.

This alternating shift in the direction of flux density in the core 31 induces currents in the secondary coils 52 and 52' which are adjacent to the core 31. The secondary coils 52 and 52' are connected in the gate circuits 11 and 11' to apply the induced currents to the gate electrodes 12 and 13 of the SCR's 14 and 15 and fire the SCR's alternately.

As previously mentioned the gate circuits 11 and 11' are identical though oppositely directed relative to the core 31. In the following description and in the drawing the components of the gate circuit 11' are indicated by the prime of the reference numeral applied to the equivalent component of gate circuit 11.

In the gate circuit 11 one end of the secondary coil 52 is connected by a conductor 53 to the conductor 24 which goes between the negative terminal 22 of the power source and the cathode sides of the SCR's 14 and 15. The other end of the secondary coil 52 is connected to the gate electrode 12 of the SCR 14 by a conductor 54. A resistor 55 and a diode 56 are connected in series in the conductor 54 with the resistor 55 between the diode 56 and end of the secondary coil 52. The resistor 55 limits the current to the gate electrode 12 and the diode 56 blocks inverse voltage. A resistor 57 is connected between the conductors 53 and 54, being connected into the conductor 54 between the diode 56 and gate electrode 12, to provide temperature stabilization for the gate electrode of the SCR 14.

As discussed earlier a reverse current must be able to flow through the secondary coil 52 in order for flux in the core 31 of the oscillator 10 to collapse sharply to zero at power removal (i.e. when power through the primary coil 37 of the oscillator drops momentarily to zero as the direction of the power to the coil 37 is reversed), so that the next half-cycle of the oscillator 10 will cause flux to build up in the core 31 to the saturation point in the opposite direction. If the flux is not built up to the saturation point in the opposite direction, the successive wave of power induced in secondary coils 52 and 52' will not be full width, the SCR's will not be operated in the manner intended and the components of the circuit could be damaged.

In addition if a reverse current cannot flow in the secondary coil, flux remaining in the core 31 when the inverter is shut off remains for a long time. It is only rarely that the flux will be at the zero point at the moment the inverter is shut off and flux is the core when the inverter is operated again will cause improper operation from the start.

The necessary reverse flow of current through the secondary coil to collapse the flux in the core cannot flow through the gate electrode of the SCR when the power is reversed. Similarly the resistor 57 and diode 56 prevent sufficient reverse flow. A resistor 58 is therefore connected across the ends of the secondary coil 52 with the resistor 55 between adjacent ends of the secondary coil and the resistor 58. The reverse current can therefore flow from the lower end of the secondary coil 52 through the resistors 58 and 55 and down through the secondary coil 52.

It will be appreciated however that the value of the resistor 58 must not be small enough to short circuit the actuating voltage to the gate electrode 12 of SCR 14. On the other hand it must not be so large as to impede the reverse current through the secondary coil 52 to an extent which would retard the collapse of the flux in the core 31 and shorten the waves of voltage induced in the secondary coil when power is reversed.

It has been found that the appropriate value for the resistor 58 which will provide effective operation of the SCR by a saturable core oscillator in accordance with this invention is determined by the formula $$\frac{eslNs}{(2H \text{ reset}) \times C} - R$$

in which $eslNs$ is the instantaneous induced voltage in the secondary coil 52 times the number of turns in the secondary coil, H reset is the optimum magnetomotive force to return the flux density in the core 31 to zero when it has been excited to the saturation point by the operation of the oscillator 10, C is the mean magnetic length of the core 31, and R is the ohmic value of the resistor 55 (or 55'). If C is in inches, H reset should be in ampere-turns per inch, but if C is in centimeters, H reset should be in oersteds. The valve given by this formula is in ohms.

A single SCR firing circuit of this invention including a saturable core oscillator 10 and the gate circuit 11 to the gate electrode 12 of SCR 14 causes the SCR 14 to produce equally spaced pulses of half-cycle square wave voltage. As described herein, two of these SCR firing circuits are paired with the second SCR 15 being connected to fire alternately with the firing of SCR 14. As shown and described below this is accomplished by coupling a gate circuit 11' to the core 31 to fire the SCR 15. The combination of the two alternately actuated SCR firing circuits thus provides an inverter to produce alternating current from a source of direct current.

As seen in the drawing the gate circuit 11' includes the same type and size components in the same relation to each other as the gate circuit 11. However in the gate circuit 11' the secondary coil 52' and associated components are reversed relative to the core 31 and are connected to the gate electrode 13 of the SCR 15. By this arrangement current induced in the secondary coil 52' when the flux in the core 31 has built up in one direction is directed to fire the SCR 15 while the current induced at the same time in the secondary coil 52 is in the opposite direction and flows through the resistor 58. At this time the SCR 14 has been turned off by discharge of the commutating capacitor 30 in the manner previously described.

When the flux in the core 31 is reversed for the next half-cycle of the oscillator 10 the direction of the currents induced in the secondary coils 52 and 52' is reversed so that SCR 14 is fired. The current induced in secondary coil 52' flows through the resistor 58' and the SCR 15 has been turned off by the commutating capacitor 30.

In the operation of this inverter circuit direct current power is applied across the terminals 32 and 33 of the oscillator 10 and the switch 27 is closed to supply direct current power to the SCR's 14 and 15 of the inverter 16. The oscillator 10 sharply raises the flux density in the core 31 to the saturation point alternately in opposite directions through the secondary coils 52 and 52'.

Current induced in the secondary coils in one direction fires one of the SCR's 14 or 15 to turn it on. The SCR which is on conducts power through one half the primary coil 19 of the transformer 20 which couples the output of the SCR's 14 and 15 to a load circuit 21. Conduction of the SCR also builds up a charge on the commutating capacitor 30.

The next half wave of current in the opposite direction through the secondary coils 52 and 52' fires the other SCR and at the same instant the commutating capacitor 30 discharges current to the cathode side of the previously conducting SCR to turn it off. The alternate firing and turning off of the SCR's 14 and 15 thus alternates the direction of current through the primary coil 19 so that the transformer 20 transfers the alternate output of the SCR's as alternating square wave current to a load circuit 21.

The above description refers to a preferred embodiment and application of the SCR firing circuit of the present invention and certain modifications may be made in the described structure and arrangement without departing from the spirit and scope of the invention defined in the following claims.

What is claimed is:

1. A circuit for firing an SCR periodically comprising an SCR having a gate electrode; a square wave oscillator including a primary coil and a secondary coil associated with a saturable core; a source of electric power connected to apply power successively in opposite directions through said primary coil to produce flux in said core alternately in opposite directions to the saturation point of the core and thereby induce alternating square wave voltage in said secondary coil; first circuit means connecting the secondary coil to said gate electrode so that a first half-cycle of current in the secondary coil fires the SCR; and second circuit means connected to turn off the SCR at the start of a second half-wave cycle of current in the secondary coil, said first circuit means including a first resistor connected in series between one end of the secondary coil and said gate electrode, and a second resistor connected between the other end of the secondary coil and the side of the first resistor away from the secondary coil.

2. A circuit as set forth in claim 1 in which said second resistor has an ohmic value not more than the value determined by the formula $$\frac{eslNs}{(2H \text{ reset } C} - R$$

in which $eslNs$ is the instantaneous induced voltage in the secondary coil times the number of secondary coil turns, H reset is the optimum magnetomotive force to return the flux density in the core to zero from the flux saturation point of the core at power removal when the direction of power through the primary coil is being reversed, C is the mean magnetic length of the core, and R is the ohmic value of the first resistor.

3. A circuit as set forth in claim 2 which includes a diode connected in series between the first resistor and said gate electrode with the cathode side of the diode toward the gate electrode, and a third resistor connected in parallel with the second resistor at the plate side of the diode.

4. A circuit as set forth in claim 2 which includes a source of electric power connected across the SCR to be conducted through the SCR when the SCR is fired and to be blocked when the SCR is turned off, and in which said second circuit means connected to turn off the SCR comprises a capacitor connected to the anode side of the SCR to be charged by power conducted through the SCR during a one half-cycle of current from the secondary coil to the gate electrode and to discharge at the start of the next half-cycle.

5. An SCR inverter circuit comprising a pair of SCR's each having an anode side, a cathode side, and a gate electrode; a coupling transformer having a center tap primary coil; said SCR's having their respective anode sides connected to the opposite ends of said primary coil; a first source of electric power connected between the cathode sides of the SCR's and the center of said primary coil; firing means connected to the gate electrodes of the SCR's to fire and turn on the SCR's alternately and periodically; and circuit means connected to turn off one of the SCR's at the moment the other is fired; said firing means comprising a square wave oscillator having a primary coil and a pair of secondary coils associated with a saturable core; a second source of electric power connected to apply power successively in opposite directions through said primary coil of the oscillator to produce flux in said core alternately in opposite directions to the saturation point of the core and thereby induce alternating square wave voltage in said secondary coils; and a pair of gate circuits connecting the secondary coils to the gate electrodes of the SCR's, one of the gate circuits being connected to conduct the first half-cycles of current from one secondary coil to one SCR in a direction to fire that SCR, the other gate circuit being connected to conduct the second half-cycles of current from the other secondary coil to the other SCR in a direction to fire that SCR, and each of said gate circuits including a first resistor connected in series between one end of the secondary coil and the gate electrode which are connected by that gate circuit and a second resistor connected between the other end of the secondary coil and the side of the first resistor away from the secondary coil.

6. An SCR inverter circuit as set forth in claim 5 in which the second resistor in each of said gate circuits has an ohmic value not more than the value determined by the formula $$\frac{eslNs}{(2H \text{ reset})\, C} - R$$

in which $eslNs$ is the instantaneous induced voltage in the secondary coil times the number of secondary coil turns, H reset is the optimum magnetomotive force to return the flux density in the core to zero from the flux saturation point of the core at power removal when the direction of power through the primary coil is being reversed, C is the mean magnetic length of the core, and R is the ohmic value of the first resistor.

7. An SCR inverter circuit as set forth in claim 6 in which each of said gate circuits includes a diode connected in series between the first resistor and said gate electrode, and a third resistor connected in parallel with the second resistor between the diode and the gate electrode.

8. An SCR inverter circuit as set forth in claim 7 in which said circuit means to turn off each SCR comprises a commutating capacitor connected between the anode sides of the SCR's.

9. An SCR inverter circuit as set forth in claim 8 in which said source of electric power is a source of direct current electric power having a positive terminal and which includes in combination a coupling transformer for transmitting power from the SCR's, said coupling transformer having a primary coil connected between the anode sides of the SCR and a tap connecting the center of the primary coil to said positive terminal.

References Cited
UNITED STATES PATENTS

| | | | |
|---|---|---|---|
| 3,206,694 | 9/1965 | Bates | 331—47 |
| 3,217,174 | 11/1965 | Barringer et al. | 307—88.5 |
| 3,248,634 | 4/1966 | Fudaley et al. | 321—45 X |

JOHN F. COUCH, *Primary Examiner.*

W. SHOOP, *Assistant Examiner.*